US009951762B2

(12) United States Patent
Franz et al.

(10) Patent No.: US 9,951,762 B2
(45) Date of Patent: Apr. 24, 2018

(54) COMPRESSOR WITH CRANKSHAFT AND INSERT

(71) Applicant: Bendix Commercial Vehicle Systems LLC, Elyria, OH (US)

(72) Inventors: Thomas J. Franz, Clinton, OH (US); Shane A. Harte, Westake, OH (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 333 days.

(21) Appl. No.: 14/801,281

(22) Filed: Jul. 16, 2015

(65) Prior Publication Data
US 2017/0016437 A1   Jan. 19, 2017

(51) Int. Cl.
| *F04B 39/02* | (2006.01) |
| *F04B 39/00* | (2006.01) |
| *F04B 35/00* | (2006.01) |
| *F04B 39/12* | (2006.01) |
| *F16C 3/14* | (2006.01) |

(52) U.S. Cl.
CPC ........ *F04B 39/0094* (2013.01); *F04B 35/002* (2013.01); *F04B 39/0284* (2013.01); *F04B 39/128* (2013.01); *F16C 3/14* (2013.01)

(58) Field of Classification Search
CPC ................ F04B 39/0284; F04B 35/002; F04B 39/0094; F04B 39/128; F16C 3/14
See application file for complete search history.

(56) References Cited

U.S. PATENT DOCUMENTS

| 4,961,669 A | 10/1990 | Itoh |
| 5,064,040 A | 11/1991 | Johnson |
| 6,196,085 B1 | 3/2001 | Chimonides |
| 6,547,479 B2 | 4/2003 | Dowling |
| 7,152,569 B2 | 12/2006 | Leiber |
| 7,431,006 B2 | 10/2008 | Jankuski |

(Continued)

FOREIGN PATENT DOCUMENTS

| EP | 2141371 A2 * | 1/2010 | ......... B21C 37/0803 |
| WO | WO 95/27148 A1 | 10/1995 | |

OTHER PUBLICATIONS

International Searching Authority, "International Search Report and Written Opinion," Report, dated Oct. 10, 2016, 11 pages, European Patent Office, Rijswijk Netherlands.

(Continued)

*Primary Examiner* — F. Daniel Lopez
*Assistant Examiner* — Abiy Teka
(74) *Attorney, Agent, or Firm* — Cheryl L. Greenly; Brian E. Kondas; Eugene E. Clair

(57) ABSTRACT

Various embodiments of a crankshaft assembly with an insert are disclosed. The crankshaft assembly for an air compressor comprises a crankshaft with a first segment; a second segment having an outside diameter and a cavity extending into a distal end. The cavity comprises a first portion having a first inner diameter; and a second portion having a second inner diameter, wherein the second inner diameter is less than the first inner diameter. The crankshaft includes a linear passage in the second segment, wherein the linear passage does not intersect the cavity. The crankshaft assembly includes an insert having a first end with a first insert diameter and a second end having a second insert diameter, wherein the insert is sized to be matingly engaged in the cavity.

20 Claims, 4 Drawing Sheets

(56) References Cited

U.S. PATENT DOCUMENTS

| | | | |
|---|---|---|---|
| 8,312,858 B2* | 11/2012 | McClave | F01M 1/02 |
| | | | 123/196 R |
| 8,763,734 B2 | 7/2014 | Fetter | |
| 2004/0221716 A1 | 11/2004 | Kim | |
| 2007/0028763 A1 | 2/2007 | Yoon | |
| 2007/0143997 A1* | 6/2007 | Behr | C21D 5/00 |
| | | | 29/888.08 |
| 2008/0145247 A1 | 6/2008 | Park | |
| 2008/0245637 A1* | 10/2008 | Fetter | B60T 17/02 |
| | | | 192/66.2 |
| 2012/0052949 A1 | 3/2012 | Do | |
| 2015/0125269 A1 | 5/2015 | Bois | |

OTHER PUBLICATIONS

Bendix Commercial Vehicle Systems LLC, "SD-01-690 Bendix BA-921 Compressor Standard and Closed Room," Service Data Sheet, Oct. 2007, 40 pages, Bendix Commercial Vehicle Systems LLC, Elyria Ohio, U.S.A.

* cited by examiner

COMPRESSOR WITH CRANKSHAFT AND INSERT

BACKGROUND

The present invention relates to embodiments of an air compressor for a commercial vehicle. An air compressor for a commercial vehicle is coupled to the engine via a crankshaft. As the compressor is driven by the vehicle's engine, the crankshaft rotates continuously. Oil is routed from the engine to the compressor oil inlet. An oil passage in the crankshaft routes pressurized oil to the main bearings of the compressor.

Commercial vehicle compressors often are equipped with a through drive mechanism so that accessory devices, such as water pumps and steering pumps, can be attached to the compressor via the crankshaft so that both the compressor and accessory device can be driven by the engine. Generally, the vehicle manufacturer desires that these accessory devices be as close as possible to the engine, but the space in the engine compartment of a commercial vehicle is at a premium. There is a need for a compact air compressor for coupling to a commercial vehicle engine that can effectively drive downstream accessory devices.

SUMMARY

Various embodiments of a compressor crankshaft assembly are disclosed. The crankshaft comprises a first segment; a second segment having an outside diameter at a distal end and a cavity extending into the second segment at the distal end. The cavity comprises a first portion having a first inner diameter; and a second portion having a second inner diameter, wherein the second inner diameter is less than the first inner diameter. The crankshaft comprises a linear passage in the second segment, wherein the linear passage does not intersect the cavity. The crankshaft assembly also includes an insert having a first end with a first insert diameter and a second end with a second insert diameter, wherein the insert is sized to be matingly engaged in the cavity.

In accordance with another aspect, a compressor assembly includes a housing; a piston in the housing; and a crankshaft in the housing coupled to the piston. The crankshaft comprises a first segment having a first journal; a second segment having a second journal and an outside diameter at a distal end. A cavity extends into the second segment and comprises a first inner diameter and a second inner diameter. The second inner diameter is less than the first inner diameter. The crankshaft includes a linear passage in the second segment, wherein the linear passage does not intersect the cavity. The crankshaft also includes an insert for driving an associated accessory device, the insert having a first end with a first insert diameter, sized to be matingly engaged with the cavity and a second end with a second insert diameter and a chamfer, wherein the second insert diameter is less than the first insert diameter.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to exemplify the embodiments of this invention.

DETAILED DESCRIPTION

Figure 1:
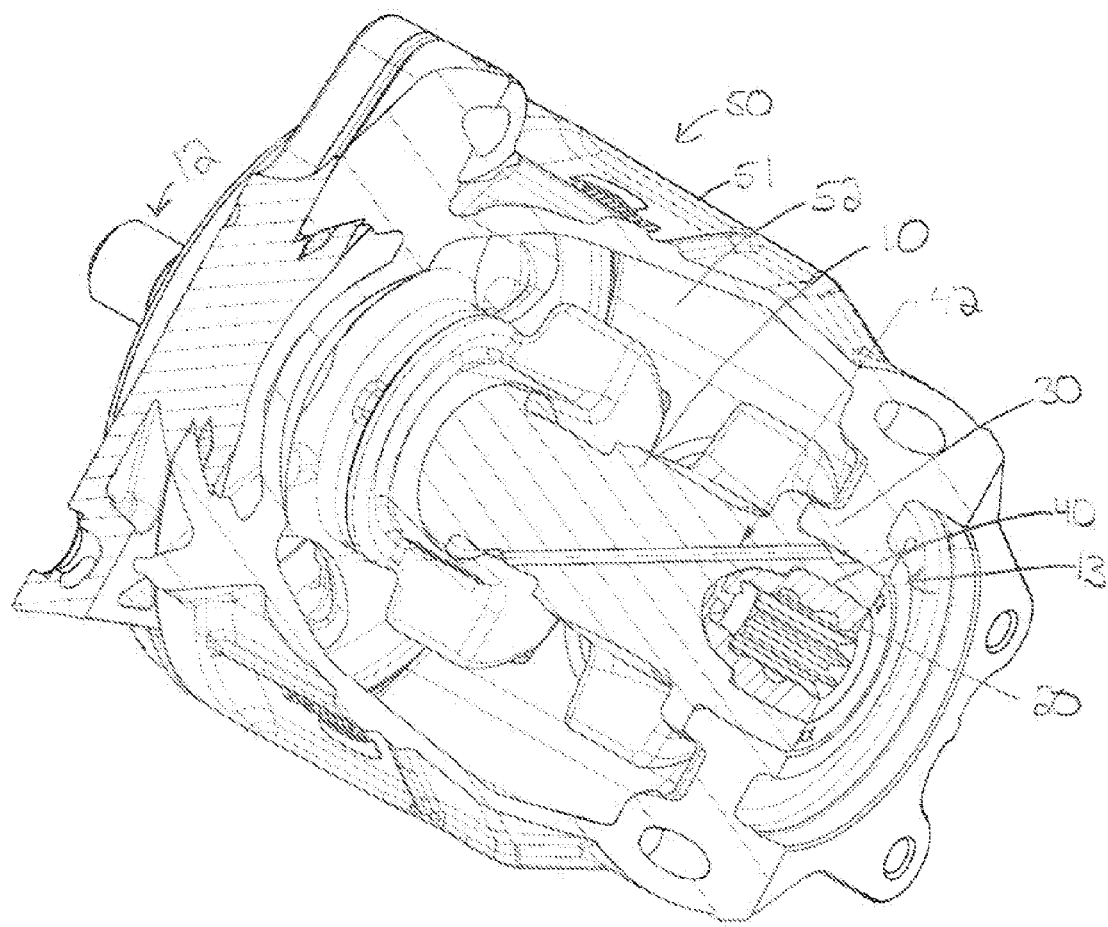
FIG. 1 illustrates a cross-sectional view of a compressor assembly according to an example of the present invention.

FIG. 1 illustrates a partial cross-sectional view of a single cylinder compressor assembly 50 according to an example of this invention. A crankshaft 10 is installed inside an opening 52 of a housing 51 of the compressor 50. The crankshaft 10 includes a first segment 12 that is connected to a rotating part of an engine (not shown). The crankshaft 10 is coupled to a piston (not shown) for compressing air when the crankshaft 10 is rotated and the compressor 50 is loaded.

The crankshaft 10 includes a cavity 40 at a distal portion of a second segment 13. The cavity 40 comprises at least a first inner diameter and a second inner diameter, wherein the second inner diameter is less than the first inner diameter.

The crankshaft 10 includes a first linear passage 42. The first linear passage 42 may be used to route pressurized oil to a bearing 30 of the compressor 50. The first linear passage 42 is machined into the crankshaft 10 in a single operation. The cavity 40 is designed so as not to intersect with the first linear passage 44 or require the first linear passage 42 to be machined in multiple operations.

An insert 20 is installed in the cavity 40 via an interference fit with the first inner diameter of the cavity 40. No other fastening devices are necessary to maintain the insert 20 in the cavity 40. An accessory device (not shown), such as a steering pump, is coupled to the compressor 50 via the insert 20. The rotary motion of the crankshaft 10 is passed to the accessory device via the insert 20. The torque provided to the accessory device is about 140 N-m.

Therefore, a compressor assembly includes a housing; a piston in the housing; and a crankshaft in the housing coupled to the piston. The crankshaft comprises a first segment, a second segment and a cavity extending into the second segment. The cavity comprises a first inner diameter and a second inner diameter, wherein the second inner diameter is less than the first inner diameter. An insert is sized to be interference fit with the first inner diameter of the cavity for driving an accessory device.

Figure 2:
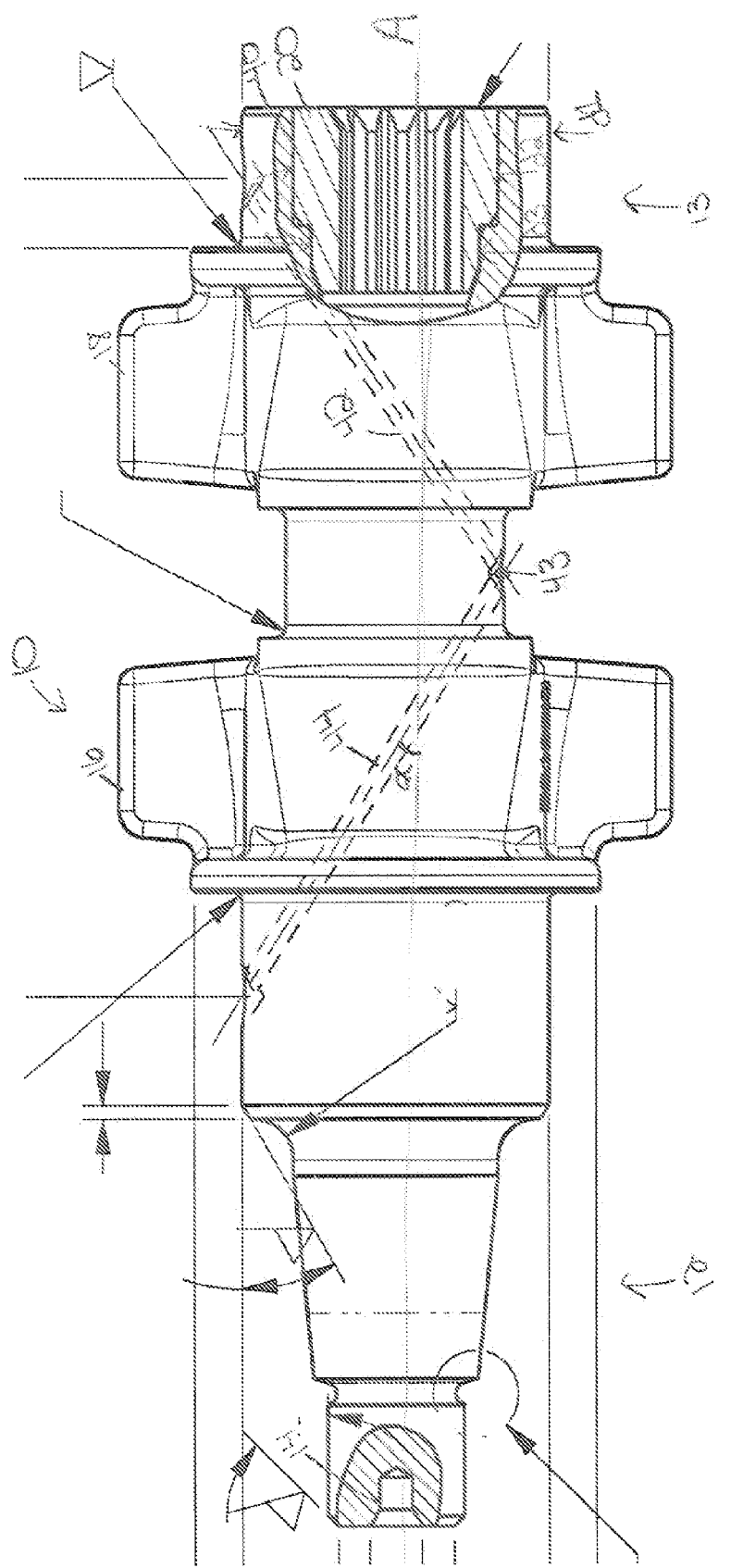
FIG. 2 illustrates a cross-section view of a crankshaft assembly according to an example of the present invention.

FIG. 2 illustrates the crankshaft 10 with a cutaway view of the insert 20 as installed. The first segment 12 includes an engine connection portion 14 and a first journal 16. The first segment 12 includes a second linear passage 44 that linearly traverses the crankshaft 10 and exits at a midpoint 43 of the first segment 12 and the second segment 13. The second linear passage 44 may be used to route oil from the engine to the first linear passage 42. The second segment 13 includes a second journal 18. The crankshaft 10 is designed to be coupled to a piston at the first journal 16 and the second journal 18. A distal end of the second segment 13 has an outside diameter d1. In one example, the outside diameter d1 is between about 40 mm and 50 mm. In another example, the outside diameter d1 is about 45 mm.

The second segment 13 includes the first linear passage 42 that enters at the midpoint 43 of the first segment 12 and the second segment 13 and exits at the distal end of the second segment 13 without intersecting the cavity 40. The first linear passage 42 and second linear passage 44 are at an angle alpha of about 20° with respect to a central axis A of the crankshaft 10. The angle alpha permits the first oil passage 42 and second oil passage 44 to be machined in the crankshaft 10 while maintaining a minimum distance from the surface of the crankshaft 10 to mitigate stress in the crankshaft 10. Each of the first linear passage 42 and the second linear passage 44 are made in a single straight machining operation through the crankshaft 10. The first linear passage 42 and the second linear passage 44 are designed to pass oil from the compressor head (not shown) to the bearing (not shown) to lubricate the compressor 50.

The cavity 40 in the crankshaft 10 is generally cylindrical with at least two portions with two different diameters. The first inner diameter d2 of the first portion is between about 25 mm and 35 mm. In another example, the first inner diameter d2 is about 30 mm. In another example, the first inner diameter d2 is between about 60% and 70% of the outer diameter d1 of the crankshaft 10. In one example, the length of the cavity 40 having diameter d2 is between about 15 mm and 20 mm. In another example, the length of the cavity 40 with the first inner diameter d2 is about 16 mm. The second inner diameter d3 of a second portion of the cavity 40 has a diameter less than diameter d2. In one example, the second inner diameter d3 is between about 20 mm and 30 mm. In another example, the second inner diameter d3 is about 24 mm. The second portion of the cavity 40 with the second inner diameter d3 has a length of about 6.6 mm. In one example, the length of the first portion of the cavity 40 having the first inner diameter is greater than about twice the length of the second portion of the cavity 40 having the second inner diameter.

In the example shown in FIG. 2, the cavity 40 is stepped from the first inner diameter d2 to the second inner diameter d3. In another example, the cavity 40 can be tapered from the first portion having the first inner diameter d2 to a distal end of the second portion having the second inner diameter d3. In both examples, the length of the cavity 40 having diameter d2 is maximized to achieve the greatest interference fit, while not intersecting with the first linear passage 42.

The insert 20 has at least two different diameters so as to be pressed into the cavity 40 with an interference fit. The compression of the insert 20 into the second segment 13 of the crankshaft 10 results in compressive pressure at the length of the cavity 40 with the first inner diameter d2. No other fastening devices need to be used to maintain the insert 20 in the cavity 40. The length of the insert 20 press fit to the first inner diameter d2 does not reduce the amount of torque provided to the accessory device, but actually increases the torque over a prior art device where the insert was coupled to the crankshaft by one or more fasteners. In one example, the torque provided is about 140 N-m. When in the installed position, the insert 40 is substantially flush with the distal end of the second segment 13 of the crankshaft 10, thereby minimizing the overall length of the crankshaft 10.

The crankshaft 10 and the insert 20 may be made of different materials and hardened to different Rockwell hardness values. In one example, the material of the crankshaft 10 may conform to steel grade SAE 4140 or may be a Chromium Molybdenum steel. The crankshaft 10 is hardened to 26-32 Rockwell C hardness value. The material of the insert 20 may conform to steel grade SAE 8620 or may be a steel alloy. The insert 20 is hardened to 72 Rockwell 30 N hardness value. The different Rockwell hardness values improve the interference fit of the insert 20 into the crankshaft 10.

Therefore, a crankshaft assembly for an air compressor comprises a crankshaft with a first segment; a second segment having an outside diameter and a cavity extending into a distal end. The cavity comprises a first portion having a first inner diameter; and a second portion having a second inner diameter, wherein the second inner diameter is less than the first inner diameter. The crankshaft includes a linear passage in the second segment, wherein the linear passage does not intersect the cavity. The crankshaft assembly includes an insert having a first end with a first insert diameter and a second end having a second insert diameter, wherein the insert is sized to be matingly engaged in the cavity.

Figure 3:
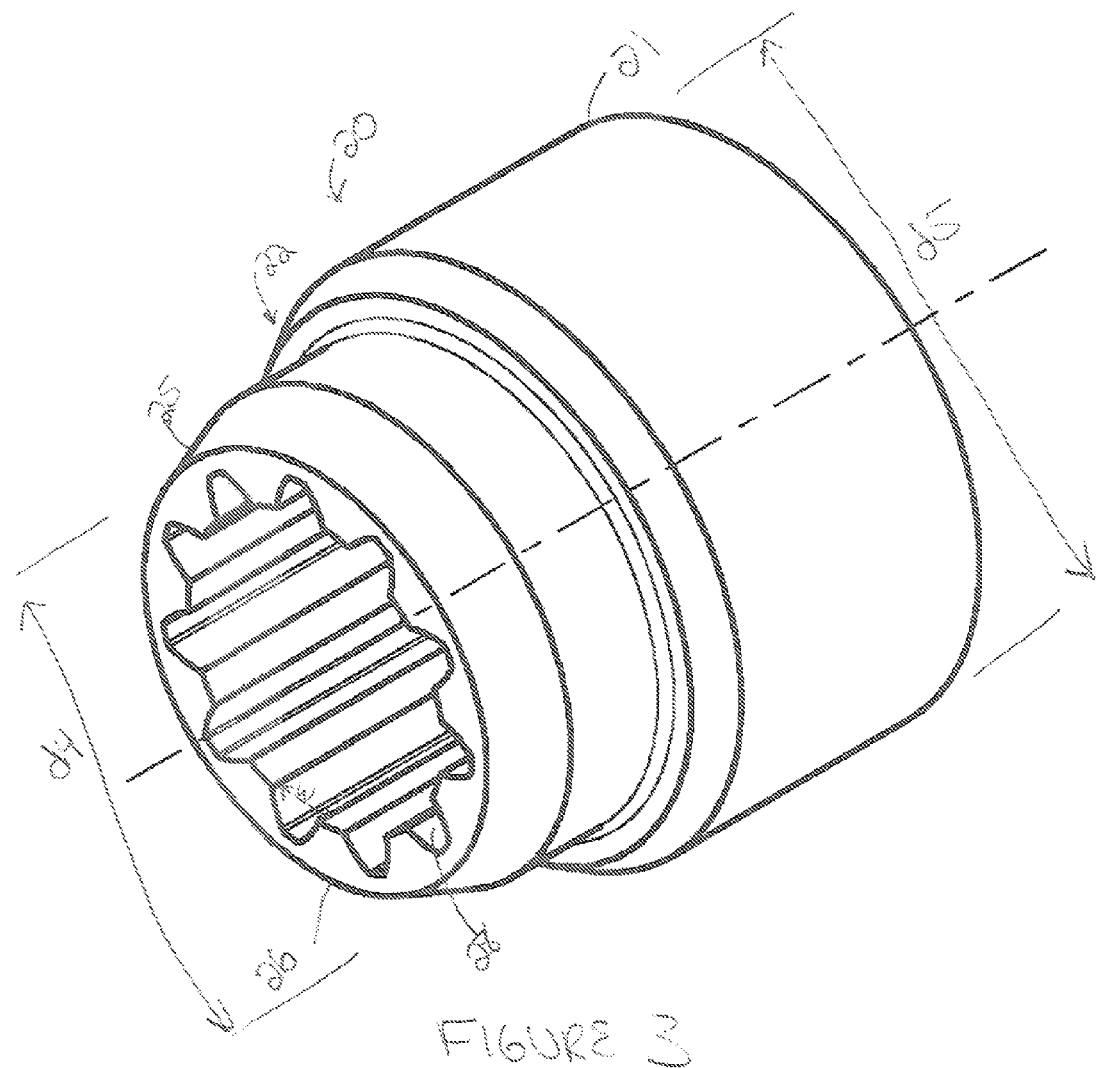
FIG. 3 illustrates a schematic representation of an insert for the crankshaft assembly according to an example of the present invention.

FIG. 3 illustrates one example of the insert 20. Insert 20 has a generally cylindrical shape with a second end 26 having a smaller diameter than a first end 21. In one example, the diameter d4 of the second end 26 is between about 22 mm and about 25 mm. In one example the diameter d5 of the first end 21 is between about 25 mm and about 35 mm. The length of the first end 21 of the insert 20 with diameter d5 is between about 15 mm and 20 mm. This length is greater than the length of the second end 26 of the insert 20 having the diameter d4. The length of the first end 21 having the diameter d5 was maximized to achieve the greatest interference fit with the first inner diameter d2 of the cavity 40.

The first end 21 having diameter d5 may be separated from the second end 26 having diameter d4 by at least one stepped portion 22. A chamfered portion 25 may be included at the second end 26. The design of the insert 20 is specific to be pressed into the cavity 40 with an interference fit. No fastening devices need to be used to maintain the insert 20 in cavity 40.

In one example, the insert 20 includes a set of internal involute splines 28. The splines 28 have a profile with a width w between each spline. In one example, the width w between each spline is about 2.5 mm. The compression of the insert 20 into the second segment 13 of the crankshaft 10 results in compressive pressure on the insert 20 at the length of the cavity 40 with the diameter d2. While the width between the splines 28 are generally designed to meet industry standards, such as ANSI B92.1, in order to efficiently mate with the accessory device, the width w between splines 28 of insert 20 are designed so that the width w is approximately 2% greater prior to installation into the cavity 40 than after installation into the cavity 40. This overcompensation of the width accounts for any distortions during the interference fit process so that the insert 20 retains the industry standard width between the splines 28 for mating with the accessory device after installation in the crankshaft 10. In another example, the insert 20 could be keyed with a slot in the cavity 40.

Figure 4:
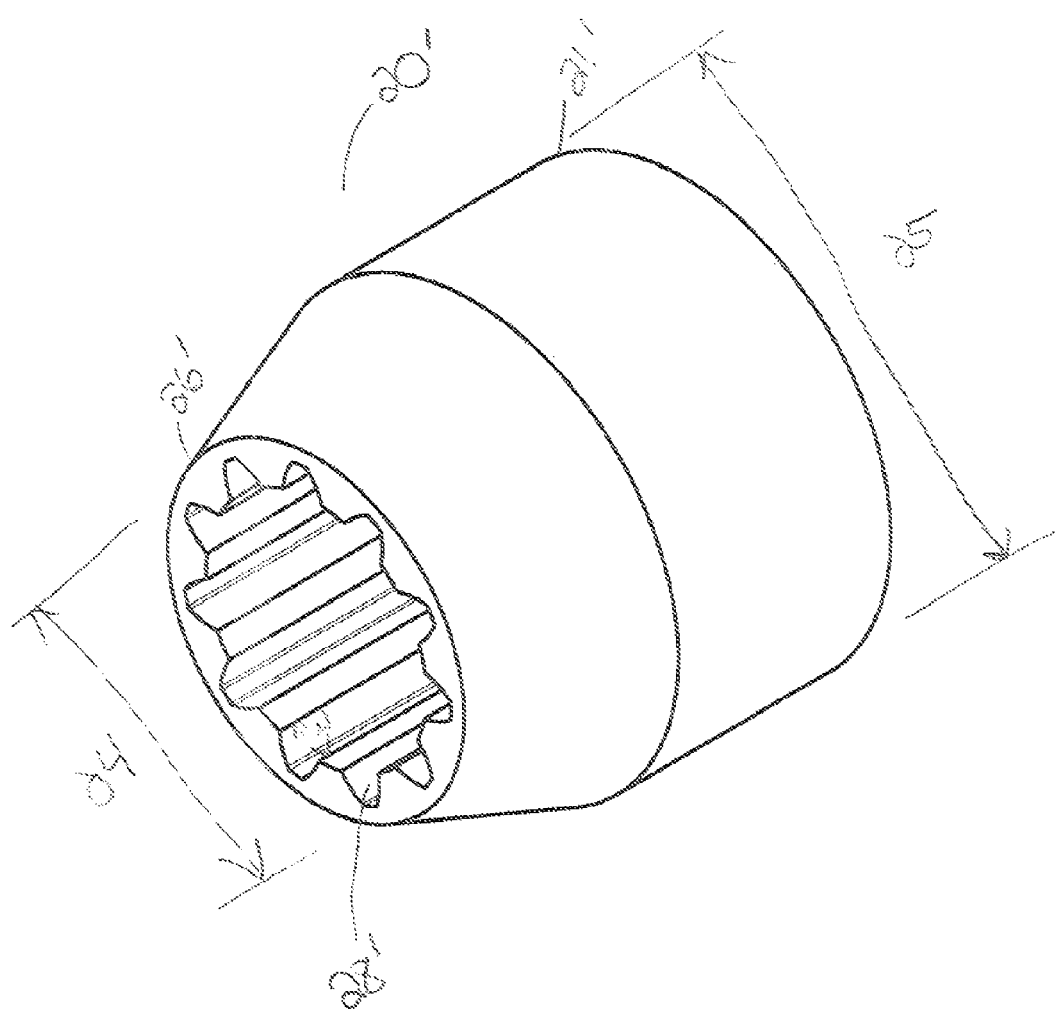
FIG. 4 illustrates a schematic representation of an insert for the crankshaft assembly according to another example of the present invention.

FIG. 4 illustrates a second example of an insert 20'. Insert 20' has a generally cylindrical shape with a second end 26' having a smaller diameter than a first end 21'. Similar to insert 20, the diameter d4 of the second end 26' is between about 22 mm and about 25 mm. Similar to insert 20, the diameter d5 of the first end 21' is between about 25 mm and about 35 mm. The length of first end 21' of the insert 20' with diameter d5 is between about 15 mm and 20 mm. This length is greater than the length of the second end 26' of the insert 20' having the diameter d4. The length having the diameter d5 was maximized to achieve the greatest interference fit with the first inner diameter d2 of the cavity 40.

The second end 26' may be completely tapered from the first end 21' to the diameter d4. The design of the insert 20' is specific to be interference fit into a cavity having a similar tapered inner diameter. No other fastening devices need to be used to keep the insert 20' in cavity 40.

Similar to insert 20, the insert 20' includes a set of internal involute splines 28'. The splines 28' have a profile with a width w between each spline. In one example, the width w between each spline is about 2.56 m. The compression of the insert 20' into the second end 13 of the crankshaft 10 results in compressive pressure on the insert 20' at the length of the cavity 40 with the diameter d2. While the width of the splines 28' are generally designed to meet industry standards to efficiently mate with the accessory device, the width w between splines 28' of insert 20' are designed so that the width w will be approximately 2% less after installation into the cavity 40. This overcompensation of the width accounts for any distortions during the interference fit process so that the insert 20' retains the industry standard width between the splines 28' for mating with the accessory device.

In comparison to an existing heavy duty engine compressor available from Bendix Commercial Vehicle Systems LLC of Elyria Ohio, the inventive compressor assembly 50 provides a greater than 30% reduction in weight, a 25% reduction of the overall length of the crankshaft, a 20% increase in the available torque and a substantial reduction in both material and manufacturing costs.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

We claim:

1. A crankshaft assembly for an air compressor for a vehicle comprising:
   a crankshaft, the crankshaft comprising:
   a first segment;
   a second segment having an outside diameter at a distal end;
   a cavity extending into the second segment at the distal end, the cavity comprising:
   a first portion having first inner diameter; and
   a second portion having a second inner diameter, wherein the second inner diameter is less than the first inner diameter;
   a linear passage in the second segment entering at a midpoint between the first segment and the second segment and exiting at the distal end of the second segment, wherein the linear passage does not intersect the cavity; and
   an insert having a first end with a first insert diameter and a second end with a second insert diameter, wherein the insert is sized to be matingly engaged in the cavity.

2. The crankshaft assembly as in claim 1, wherein the first end of the insert is interference fit with the first portion of the cavity.

3. The crankshaft assembly as in claim 1, wherein the cavity is stepped between the first portion and the second portion.

4. The crankshaft assembly as in claim 1, wherein the length of the first portion of the cavity having the first inner diameter is twice as long as the length of the second portion of the cavity having the second inner diameter; and length of the first end of the insert having the first insert diameter is substantially the same as the length of the first portion of the cavity having the first inner diameter.

5. The crankshaft assembly as in claim 1, wherein the cavity is tapered.

6. The crankshaft assembly as in claim 5, wherein the second portion of the cavity is tapered from the first portion to a distal end of the second portion.

7. The crankshaft assembly as in claim 6, wherein the distal end of the second portion has the second inner diameter.

8. The crankshaft assembly as in claim 1, wherein the first inner diameter of the cavity is between about 60% to about 70% of the outer diameter and the second inner diameter of the cavity is between 50% and 60% of the outer diameter.

9. The crankshaft assembly as in claim 1, wherein the insert is a material with a greater Rockwell hardness value than a material of the crankshaft.

10. The crankshaft assembly as in claim 1, wherein the insert is flush with the distal end of the second segment of the crankshaft when installed in the cavity.

11. The crankshaft assembly as in claim 1, wherein the insert comprises an internal involute spline.

12. The crankshaft assembly as in claim 11, wherein the splines are sized such that the width between splines prior to installation is 2% greater than the width between splines after installation into the cavity.

13. The crankshaft assembly as in claim 1, wherein the linear passage is an oil passage machined in a single operation at an angle from a point where the first segment meets the second segment.

14. A compressor assembly for a vehicle comprising:
   a housing;
   a piston in the housing;
   a crankshaft in the housing coupled to the piston comprising:
   a first segment having a first journal;
   a second segment having a second journal and an outside diameter at a distal end;
   a cavity extending into the second segment at the distal end, the cavity comprising:
   a first inner diameter; and
   a second inner diameter, wherein the second inner diameter is less than the first inner diameter;
   a linear passage in the second segment entering at a midpoint between the first segment and the second segment and exiting at the distal end of the second segment, wherein the linear passage does not intersect the cavity; and
   an insert for driving an associated accessory device, the insert having a first end with a first insert diameter, sized to be matingly engaged with the cavity, and a second end with a second insert diameter and a chamfer, wherein the second insert diameter is less than the first insert diameter.

15. The compressor assembly as in claim 14, wherein the first end of the insert is interference fit with the first inner diameter of the cavity.

16. The compressor assembly as in claim 14, wherein the first inner diameter of the cavity is between about 60% to about 70% of the outer diameter and the second inner diameter of the cavity is between 50% and 60% of the outer diameter.

17. The compressor assembly as in claim 14, wherein the insert comprises internal involute splines.

18. The compressor assembly as in claim 17, wherein the splines are sized such that the width between splines prior to installation of the insert in the cavity is 2% greater than the width between the splines after installation.

19. The compressor assembly as in claim 14, wherein compressor assembly is capable of driving the accessory device with a torque of 140 N-m when the accessory device is mated with the insert.

20. A compressor assembly for a vehicle comprising:
   a housing;
   a piston in the housing;
   a crankshaft in the housing connected to the piston comprising:
      a first segment having a first journal;
      a second segment having a second journal and an outside diameter at a distal end;
      a cavity extending into the second segment at the distal end, the cavity comprising:
         a first inner diameter; and
         a second inner diameter, wherein the second inner diameter is less than the first inner diameter; and
      a linear oil passage machined in the second segment in a single operation at an angle from a point where the first segment meets the second segment and exiting at the distal end of the second segment, wherein the linear oil passage does not intersect the cavity; and
   means for rotating an accessory device via the crankshaft.

* * * * *